Dec. 22, 1953     N. C. PRICE     2,663,517
AIRCRAFT POWER PLANT INSTALLATION
Filed Oct. 11, 1949     4 Sheets-Sheet 2
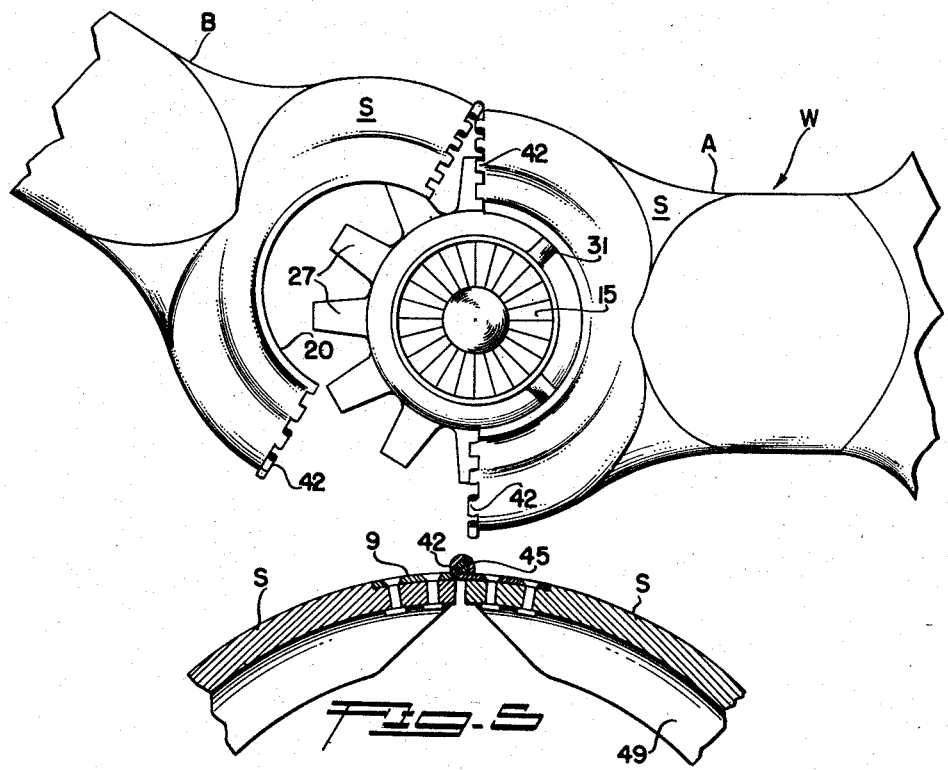
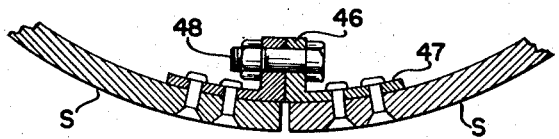
INVENTOR.
NATHAN C. PRICE
BY
*George C. Sullivan*
Agent

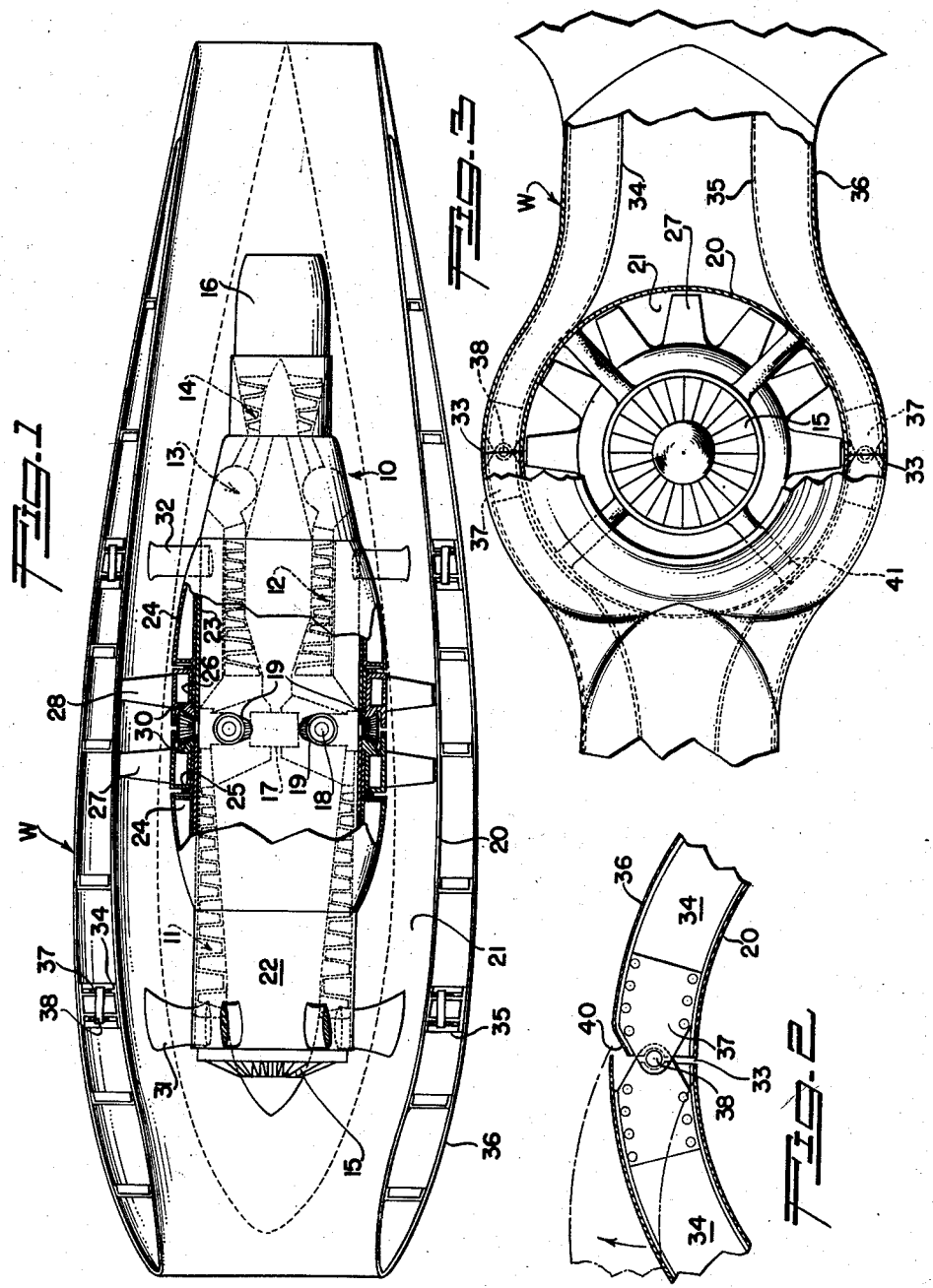

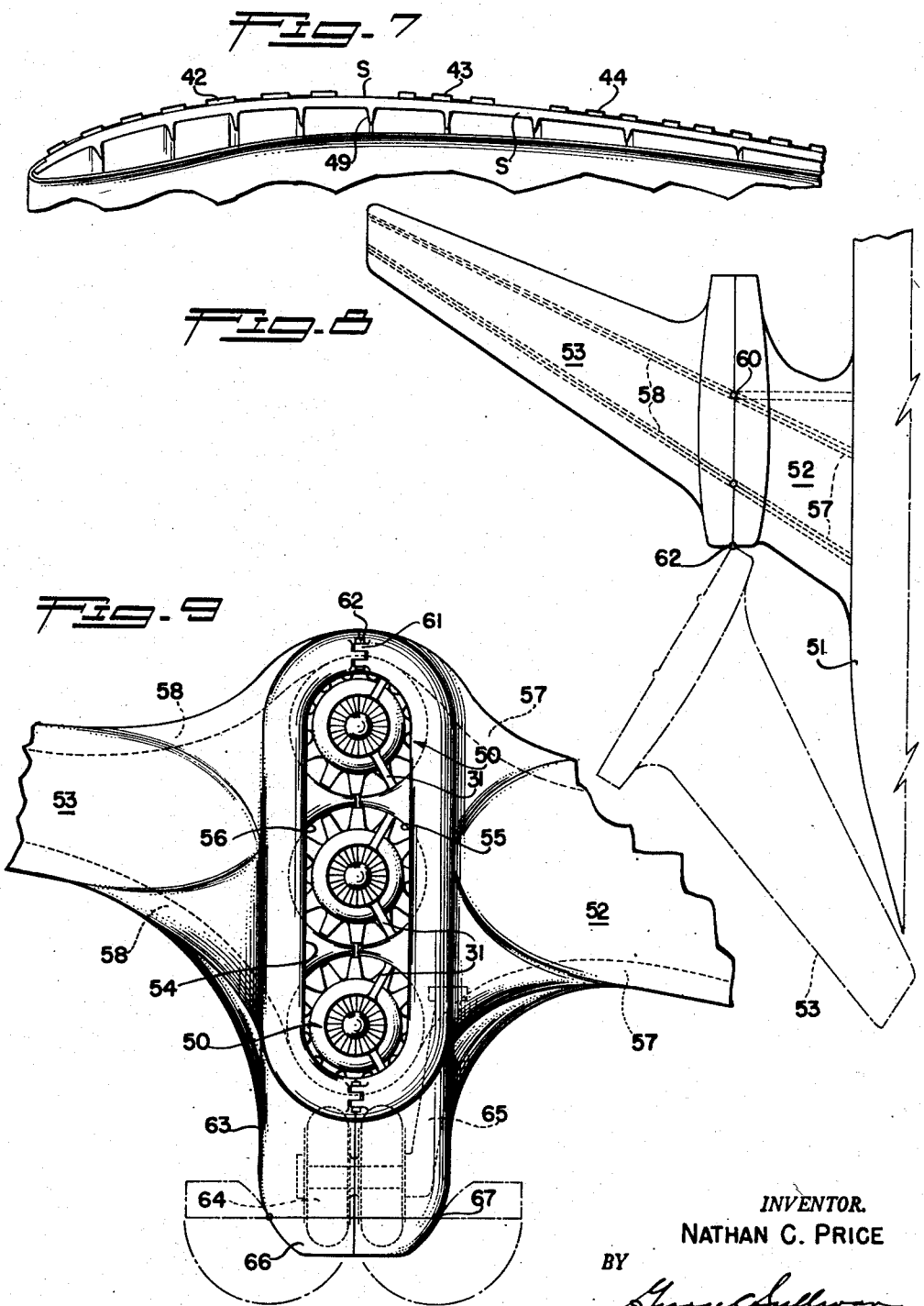

Dec. 22, 1953 N. C. PRICE 2,663,517
AIRCRAFT POWER PLANT INSTALLATION
Filed Oct. 11, 1949 4 Sheets-Sheet 4
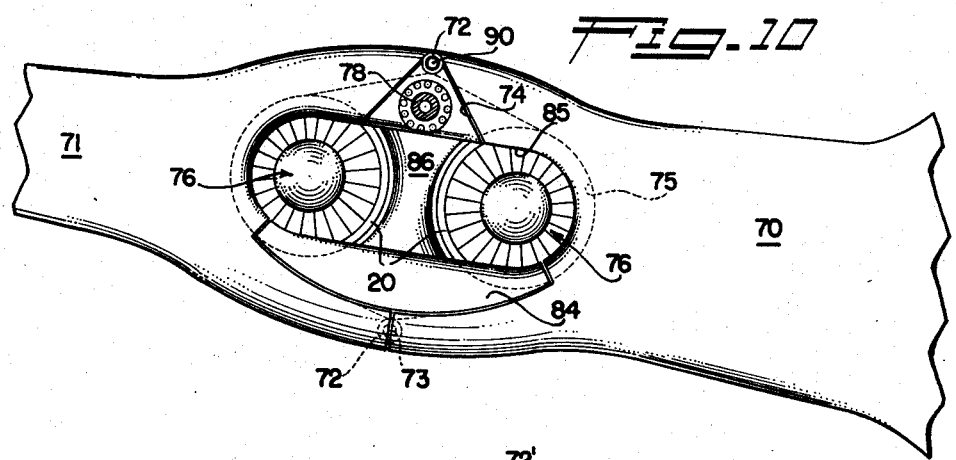
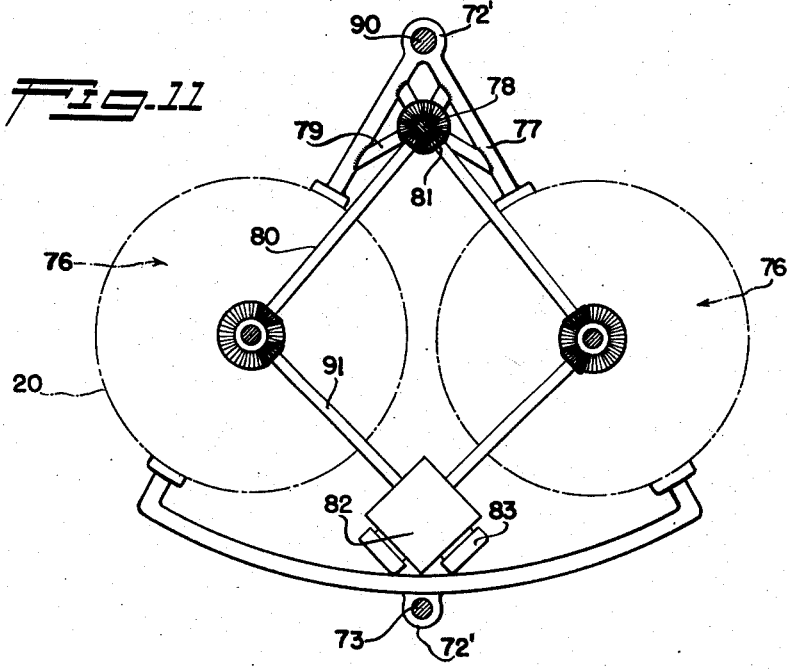
INVENTOR.
NATHAN C. PRICE
BY
*George C. Sullivan*
Agent Patented Dec. 22, 1953

2,663,517

UNITED STATES PATENT OFFICE 2,663,517

AIRCRAFT POWER PLANT INSTALLATION

Nathan C. Price, St. Helena, Calif., assignor to Lockheed Aircraft Corporation, Burbank, Calif.

Application October 11, 1949, Serial No. 120,793

18 Claims. (Cl. 244—15)

This invention relates to aircraft and relates more particularly to the installing or mounting of propulsive powerplants in aircraft. The present application is a continuation-in-part of my copending application Serial No. 492,647 filed in the United States Patent Office June 28, 1943, now Patent No. 2,501,633.

While not confined to any specific type of powerplant, the present invention is well adapted for use with turbojet and turbo-propeller type engines and related powerplants and with the installation of such engines in the wings and other parts of airplanes. In many present day aircraft turbojet engines are suspended below the wings on struts or spars which increase the aerodynamic drag and such installations complicate the engine controls, etc. It is desirable to "submerge" the engines in the wings, that is to house the engines within the confines of the wing, but where the wings are relatively thin and/or where the engines are large in diameter, this has been impractical owing to the fact that the beams, wing attachment elements, and the like, must pass through the area occupied by the engine or the wing structure must be made excessively complicated and with large frontal areas. Such considerations are aggravated where the powerplants are of the ducted fan type, that is where there are annular air ducts surrounding the engines to greatly increase the jet air flow, which cause the overall diameter of the engine structures to be greater.

It is a general object of the present invention to provide aircraft engine installations wherein the engines are mounted in a simple, effective manner within the wings or other parts of the airplane without complicating or modifying the engine structure or operation and without materially increasing the aerodynamic drag. In accordance with the present invention a powerplant such as a ducted fan turbojet engine having an outside diameter that is greater than the thickness of the wing, may be mounted in the wing while providing a faired continuous wing structure around and past the engine without the necessity of extending interfering members into or through any part of the powerplant or powerplant ducts.

Another object of the invention is to provide an aircraft powerplant installation of this character which permits easy access to the engine for inspection, repair, and removal.

Another object of the invention is to provide a powerplant installation wherein the wing or other aircraft structure carrying the engine, is constructed so that it may be parted or hinged to give full access to the engine and to economize in hangar space or deck space in the case of naval aircraft operating from aircraft carriers. The construction is such that the wing, or the like, may be folded or hinged upwardly to facilitate inspection, servicing, and replacement of the powerplant and its accessories and to conserve hangar space or deck space. In one embodiment of the invention the wing, or a portion of the wing, may swing forwardly or aft about a generally vertical axis upon the removal of simple attachment bolts, pins, or the like, to expose the engine for servicing, etc. and to economize in deck or hangar space.

A further object of the invention is to provide powerplant installations of the class referred to which may include one, two, or more engines.

A still further object of the invention is to provide an aircraft powerplant installation of the general class mentioned including a hinged wing section, or the like, that may be swung to a position to give access to the engine or engines, and a frame or gondola carrying the engines and their accessories, in such a manner that the engines, accessories, propeller drives, etc. are all readily made accessible for inspection, servicing and replacement.

Other objectives and features will become apparent from the following detailed description of typical preferred forms of the invention throughout which description reference is made to the accompanying drawings wherein:

Figure 1 is a vertical, longitudinal, sectional view of a ducted fan type powerplant mounted within a wing structure with the major portions of the powerplant and the end of a wing section appearing in side elevation;

Figure 2 is an enlarged fragmentary sectional view illustrating one of the wing attachments employed in the structure of Figure 1;

Figure 3 is a fragmentary front elevation of the construction of Figure 1 with a portion broken away to appear in vertical cross section;

Figure 4 is a fragmentary front elevation of an engine installation similar to that shown in Figure 1 illustrating a wing section being swung upwardly to expose the engine;

Figure 5 is an enlarged fragmentary vertical sectional view of the hinge attachment embodied in the structure of Figure 4;

Figure 6 is an enlarged fragmentary vertical sectional view of another type of wing attachment means that may be incorporated in the engine installation of the invention;

Figure 7 is a fragmentary view of a wing section embodying a type of hinge connection that may be employed with integrally stiffened skin structures in engine installations of the invention;

Figure 8 is a fragmentary elevation view of a portion of an airplane illustrating another engine installation of the invention with full lines showing a wing section in the normal position and the broken lines illustrating the wing section in the position where the engines are exposed for servicing, etc.;

Figure 9 is an enlarged front elevation of a portion of the construction shown in Figure 8;

Figure 10 is a fragmentary front view of still another engine installation of the invention; and Figure 11 is an enlarged diagrammatic view of the engine and gondola assembly of the structure illustrated in Figure 10.

Figures 1, 2 and 3 illustrate a form of the invention characterized by a turbojet powerplant, or the like, installed within an aircraft wing W. The particular powerplant illustrated is of the ducted fan or compressor type described and claimed in my copending application Serial No. 492,647 referred to above. The powerplant includes an inner or main casing 10 containing a first stage compressor 11, a second stage compressor 12, a combustion chamber 13 receiving the compressed air from the compressor system and delivering heated compressed air and combustion gases to a turbine 14 to drive the same. The forward end of the casing 10 has an air inlet 15 for the first stage compressor 11 and a nozzle 16 is provided at the rear end of the casing 10 for discharging the heated compressed air and combustion gases from the turbine 14 in the form of a propulsive jet. The turbine 14 serves to drive the second stage compressor 12 and a drive 17 is provided between the first and second stage compressors whereby the second stage compressor 11 is also driven by the turbine. This drive includes a plurality of spaced radial shafts 18 carrying bevel pinions 19.

The powerplant is designed to handle a large mass of air being provided with a propulsive blower means at the exterior of the casing 10. A tubular envelope 20 surrounds the casing 10 with substantial clearance, leaving an annular air duct 21. The envelope 20 is considerably longer than the casing 10 so that the duct 21 has a diffuser portion ahead of the compressor inlet 15 and the duct continues rearwardly beyond the propulsive nozzle 16. The forward diffuser portion of the envelope 20 is rearwardly divergent while the rear discharge portion of the envelope is rearwardly convergent. A cylindrical shroud member 22 closely encircles the forward portion of the engine casing 10 and a cylindrical bearing support 23 encircles the casing 10 at the rear of the member 22. Spaced rotor fairings 24 are carried by the support 23. The propulsive blower includes a pair of rotors 25 and 26 rotatably carried by the bearing support 23 through suitable bearings and provided with rows of impeller blades 27 and 28. The rows of blades 27 and 28 encircle the powerplant to operate in the air duct 21. The bladed impeller rotors 25 and 26 are driven in opposite directions by the above-mentioned pinions 19 which mesh with ring gears 30 fixed on the spaced rotors. It will be seen that the counter-rotating blades 27 and 28 are effective in moving a large mass of air rearwardly through the duct 21 to mingle with the jet discharging from the nozzle 16 to appreciably augment the propulsive effect. The shroud member 22 and fairings 24 in conjunction with the streamlined envelope 20 provide a smooth annular air duct 21 of varying cross section for this annular mass flow of air. A plurality of spaced radial struts 31 extend between the shroud member 22 and the envelope 20 to concentrically support the forward portion of the powerplant assembly in the shroud and a similar set of radial struts 32 connect the support member 23 and the shroud to mount the powerplant assembly in the intermediate portion of the envelope.

In accordance with the invention the powerplant with its envelope 20 and propulsive compressor means, is mounted within a wing W, or other portion of the airplane, in such a manner that the powerplant may be made conveniently accessible for servicing, etc. As illustrated in Figure 3 of the drawings, the powerplant is installed in an outboard position in the wing W. The tubular shroud, or envelope 20, is longitudinally and preferably diametrically split at 33 on a plane that is perpendicular to or at an obtuse angle to the spanwise plane of the wing W. As best shown in Figure 3, the outside diameter of the envelope 20 is equal to or greater than the thickness of the wing W and the upper and lower longitudinal wing spars or beams 34 and 35 and the skin 36 of the wing are smoothly contoured to permit the reception of the powerplant in the wing and yet maintain an aerodynamically acceptable or desirable wing configuration.

The wing structure is divided or split at the plane 33—33, that is the beam 34 and 35 and the skin 36 are capable of separation at this plane to give access to the powerplant. The beams 34 and 35 are normally connected or joined at the plane 33—33 by suitable lug and pin fittings 37 having removable pins 38. Such a connection is illustrated in detail in Figure 2. The above described struts 31 and 32 serve to secure the powerplant, the shroud member 22, the bearing support 23, and associated powerplant instrumentalities to the inboard half or section of the split or divided envelope 20. This inboard section of the envelope 20 is in turn secured in the inboard portion of the wing W. The outboard section or half of the envelope 20 is secured in the outboard section of the wing W. This arrangement permits either the complete disconnection of the outboard section of the wing W, that is the portion of the wing outward of the plane 33—33, from the inboard or remaining part of the wing upon removing the pins 38 from the several fittings 37 or the hinging of the outboard wing section to a position where the powerplant is readily accessible. As shown in Figure 2, the skin 36 of the inboard portion of the wing W adjacent the plane 33—33 may be recessed or inclined as at 40 to permit the outboard portion of the wing W to be swung upwardly as indicated by the arrow and broken lines in Figure 2 after removing the pins 38 from the lower fittings 37. It will be observed that the plane 33—33 of parting of the two wing sections occurs at the region of maximum thickness of the wing assembly so that smaller forces are imposed on the individual attachment means 37—38. I have shown in Figure 3, spaced dummy struts 41 extending between the member 22 and the outboard half of the envelope 20 to balance the assembly and, if desired, to aid in supporting or bracing the powerplant in the wing structure. The powerplant accessories, fuel and coolant pumps, etc. may be conveniently located within the inboard section of the wing W where they may become accessible upon either removal of the outboard portion of the wing or upon raising or hinging the same.

Figures 4, 5, 6 and 7 illustrate a slightly different arrangement wherein the connections between the inboard and outboard sections A and B of the wing W are made directly between heavy or thick skins S. Thus, as best illustrated in Figures 4, 5 and 7, the skin S at the plane of separation of the wing sections A and B have spaced sets or groups of spaced and interfitting tubular lugs 42. These lugs 42 may be provided at both the upper and lower edges of the skins S as shown in Figure 4 and are formed and related so that the lugs on the outboard wing section B mate with or fit between the lugs on the inboard wing section A. Where the skins S are formed of heavy stock the lugs 42 may be integral therewith or, if desired, the lugs may be provided on separately formed strips or parts 9 secured to the skin as seen in Figure 5. The sets of lugs 42 preferably follow, generally, the curvature of the wing W, however there should be at least one pair of interfitting sets of lugs 42 that lies on a straight line at either the top or bottom of the wing. Thus as shown in Figure 7, there are two spaced sets 42 and 44 of lugs 42 lying along a common straight line or axis and adapted to mate with corresponding sets of lugs 42 on the other wing section to form hinges. Upon engaging rods, wires, or pins 45 through the straight line sets of tubular lugs, hinges are provided which connect the wing sections A and B. Similar rods or wires 45 are engaged through the curved or inclined sets of lugs 42 to form additional connections between the wing sections A and B. While I have shown the lugs 42 associated with the skins S that are integrally stiffened with internal ribs 49, it is to be understood that the lugs 42 and their securing wires or rods 45 may be employed with other types of wing structures and assemblies.

Figure 6 illustrates a type of flange and bolt connection that may be employed at one edge, say the lower edge of the connection between the wing sections A and B with the above described tubular lugs 42 and rods or wires 45 employed along the other edge. This connection comprises opposing lugs 46 having flanges 47 bolted, riveted, or otherwise fixed to the skins S of the sections A and B with screws or bolts 48 passed through openings in the lugs.

It is believed that it will be readily understood how the structures of Figures 4 to 7 inclusive may be employed. The powerplant assembly is mounted in the inboard wing section A through the above described spars 31 and 32 and the outboard part or section of the envelope 20 is secured in the outboard wing section B. The wires or hinge rods 45 are arranged through the interfitting tubular lugs 42 to dependably join the wing sections A and B. When it becomes desirable or necessary to inspect or service the powerplant, the rods or wires 45 are withdrawn from the lugs 42 along one margin of the wing, say along the lower edge of the connection between sections A and B and the rods or wires 45 are withdrawn from the sets of lugs 42 at the upper side of the assembly except for the rods or wires in the aligned groups of lugs 43 and 44. The outboard wing section B may then be swung upwardly to an elevated or generally vertical position to expose the powerplant assembly. Figure 4 of the drawings illustrates the outboard section B in a partially raised position and shows how the powerplant, although supported in the inner wing section A is readily accessible. Following the inspection, servicing, or replacement of the powerplant, the outboard wing section B may be returned to its normal operative position, and the wires or rods are reinserted in the interfitting lugs 42 along both the upper and lower edges of the wing connection. It will be observed that when the outer wing section B is in the raised position the airplane occupies a much smaller hangar space or deck space, thereby greatly facilitating the handling and storage of the airplane.

Figures 8 and 9 illustrate another aircraft engine installation of the invention, this particular construction including a plurality of engines. In this installation there may be two or more engines 50. I have shown three ducted blower type turbojet engines 50, of the kind illustrated in Figure 1, arranged in a vertical series, it being apparent that only one or two such engines may be used in this type of installation if desired. The powerplant or engines 50 are positioned one above the other in a vertical group with the longitudinal axes of the engines extending substantially parallel with the fore and aft axis of the airplane fuselage 51. The airplane wing, which is of the sweptback form, has an inboard section 52 and outboard section 53, the group of engines 50 being arranged in a vertical plane at the line of joinder or connection of the wing sections. While the inboard section 52 is shown to have substantial length, it may be quite short to be in the form or nature of a fillet between the fuselage 51 and the principal wing part or section 53. The wing sections 52 and 53 are broadened or extended in the vertical direction to accommodate the series of engines 50 and are formed to have or define a ram air inlet 54. The sections 52 and 53 are further provided with opposite complementary semi-tubular envelope sections 55 and 56 which mate to form the duct providing envelopes for the engines 50. The ducts defined by the envelope sections 55 and 56 communicate at their forward ends with the inlet 54 and the wing sections 52 and 53 may be extended rearwardly to accommodate rear portions of the duct sections 55 and 56. The above described struts 31 and 32 serve to support or mount the engines 50 in the duct sections 55 of the inboard wing section 52.

In accordance with the invention, the outboard wing section 53 is either removably or hingedly associated with the section 52 to give free access to the engines 50 and to facilitate handling and storing of the airplane. The wing sections 52 and 53 have two or more main beams 57 and 58 which may follow the contour of the vertically broadened engine containing part of the wing and their confronting ends are connected by releasable joints, for example by removable pins 60. The forward sides of the wing sections 52 and 53 are shown equipped with hinge connections at or adjacent the vertical plane of separation of the sections. I have shown sets of interfitting hinge lugs 61 on the sections 52 and 53 above and below the inlet opening 54 with hinge pins 62 engaged through openings in the lugs to hingedly connect the sections. The hinge pins 62 are substantially vertical and are axially aligned so that upon removal of the connecting pins 60 the wing section 53 may be swung or hinged with respect to the section 52.

As illustrated in Figure 8, the wing section 53 may be swung from the normal full line position to the position shown in broken lines where the engines 50 are exposed for servicing, inspection, or replacement. With the main wing section 53 in the broken line position of Figure 8, the airplane occupies a greatly reduced hangar space or deck space and may be more easily handled on the deck or in the hangar. The wings of the airplane may be quickly conditioned for service by simply swinging the sections 53 back to their operative position and reinstalling the main attachment pins 60.

The engine installation means of Figures 8 and 9 may be designed to accommodate or carry the landing gear for the aircraft. In this case the vertically broadened portions of the wing sections 52 and 53 which contain the powerplants 50, have extensions 63 at their lower ends. These extensions 63 are shaped and proportioned to house the landing wheels 64 and the lower part of the landing gear. The struts 65 of the landing gear extend upwardly in the wing section 52 and may be appropriately secured in the wing structures. The lower end of the extensions 64 are closed by doors 66 which are hinged at 67 in such a manner that they may be swung outwardly to expose the landing wheels 64 and, if necessary, to permit lowering of the landing gear. It will be noted that the landing gear is exposed and made fully accessible when the wing section 53 is swung forwardly to the broken line position illustrated in Figure 8.

Figures 10 and 11 show the invention incorporated in an installation embodying a pair of turbo propeller engines arranged to drive a single propeller or a pair of counter-rotating propellers. In this embodiment of the invention the wing of the airplane has an inboard section 70 and an outboard section 71, it being understood that each wing of the airplane includes two such sections. The opposing or confronting edges of the wing sections 70 and 71 are connected by lug and pin connections 72 arranged adjacent their upper and lower margins. The upper connections 72 are adapted to serve as pivotal joints or hinge connections when the pins 73 are removed from the lower connections 72, thus permitting the outboard wing section 71 to be swung upwardly. The opposing or confronting ends of the wing sections 70 and 71 are shaped to leave a space or cavity 74. This cavity 74 is sector shaped in front elevation and vertical cross section, the side walls of the cavity radiating from the center or axis of the upper connections 72 and the lower wall of the cavity being curved concentrically about the same axis. The side walls of the cavity 74 are formed with semi or partially cylindrical recesses 75 which are adapted to receive the outer portions of the envelopes 20 of the engines 76. The two engines 76, which may be of the same general type and construction as the engine illustrated in Figure 1, are arranged in spaced apart side by side relation.

The engines 76 are carried by a gondola or mounting frame 77 which, in turn, is received in the cavity 74. The frame 77 may be formed of rods, tubular stock, or the like, and, as illustrated, may have the same general shape as the cavity 74. In some instances the frame 77 may be secured to or primarily associated with the inboard wing section 70 or, in other cases its upper end 72' may be attached at the upper wing attachments 72 while its lower end 72' is attached at the lower wing attachments 72. Thus if the bolts, pins 90, or the like, are partially withdrawn at the upper attachments 72, the entire gondola may be removed from the wing, yet until these bolts are entirely withdrawn the wing will remain hinged at the upper attachments 72. The propeller shaft 78 is appropriately mounted in the frame 77, for example it may be carried in the upper central portion of the frame by suitable supports 79. The envelopes 20 of the engines 76 are secured to the side parts or members of the frame 77 so that the engines are carried by the frame. Shaft and gear drives, illustrated diagrammatically in Figure 11, extend from the engines 76 to the propeller shaft 78. These drives may comprise radial engine shafts 80 having geared connections 81 with the propeller shaft 78. The shafts 80, which are driven by the engine turbines 14, may correspond to or may constitute certain of the above described shafts 18.

The forward and aft ends of the frame 77 may be provided with suitable fairings or end closures. At the forward end of the frame 77 these fairings 84, together with the adjacent leading edge portions of the wing sections 70 and 71, define an elongate ram inlet opening 85 for the engines. A central covering 86 is provided between the envelopes 20 of the two engines 76.

The engine carrying frame 77 may be utilized to support the engine accessories and accessory gear boxes. The gear boxes 82 are shown arranged in the lower portion of the frame 77 and radial engine shafts 91, corresponding to the above described shafts 18, extend from the engines 76 to the gear boxes. The accessories 83, such as the fuel pumps, etc. may be suitably positioned in the frame 77 to be driven from the gear boxes 82.

It will be seen that with the engine installation of Figures 10 and 11, the outboard wing section 71 may be swung upwardly to a generally vertical position after removing the lower attachment pins 73 and that this exposes the two engines 76 for inspection, servicing, etc. The gondola or frame 77 may be so mounted on the inboard wing section 70, or if preferred from the upper wing attachments 72, that it may be detached from the airplane together with the engines and engine accessories for major overhauls and replacements. In the latter instance, following the outboard wing section 71 having been folded upward, the gondola 77 can be swung part of the way out, to expose the sides of both inboard and outboard engines. Following either inspection, servicing, etc. or replacements, the outboard wing section 71 may be swung down to its normal operating position and secured in place by the lower attachment pins 73.

Having described only typical forms of the invention I do not wish to be limited to the specific details herein set forth, but wish to reserve to myself any variations or modifications that may appear to those skilled in the art and fall within the scope of the following claims.

I claim:

1. In an airplane comprising a wing, a tubular envelope forming a chordwise passage extending in said wing from the leading edge to the trailing edge and adapted to contain a propulsive blower, said tubular envelope being parted substantially axially for division into two parts, said wing including a beam positioned spanwise therein and extending over and under the upper and lower portions of the tubular envelope, and detachable joints in said beam at the points of parting of the envelope whereby the wing may be separated into two sections to open and expose the interior of the envelope.

2. In an airplane, a wing, the wing being divided at a substantially chordwise plane into an inboard section and an outboard section, a tubular envelope defining an air duct and arranged between said sections of the wing, the envelope being parted axially at said plane for division into two parts, a powerplant spaced within the envelope, and means for connecting the inboard and outboard sections of the wing and releasable to allow relative movement between the sections to expose the powerplant.

3. In an airplane, a wing, the wing being divided at a generally chordwise plane into an inboard section and an outboard section, a tubular envelope defining an air duct and arranged between said sections of the wing, the envelope being parted axially at said plane for division into two parts, one of said parts being carried by the inboard section and the other of said parts being carried by the outboard section, a powerplant spaced within the envelope, blower means driven by the powerplant to move air axially through said duct, and means for connecting the inboard and outboard sections of the wing and releasable to allow relative movement between the sections to expose the powerplant.

4. In an airplane, the combination of a wing having an inboard section and an outboard section, the sections having confronting ends, there being a cavity between said ends extending in a chordwise direction, a propulsive powerplant in the cavity, and attachment means connecting the sections one to the other at said ends and releasable to allow relative movement between the sections to expose the powerplant.

5. In an airplane, the combination of powerplant means, a wing having an average vertical thickness less than the vertical thickness of the powerplant means, the wing including an inboard section and an outboard section having confronting ends and being thickened vertically adjacent said ends, there being a cavity in the thickened portions of said sections extending in a chordwise direction and containing the powerplant means, means securing the powerplant means to one of the sections, and attachment means securing said ends together and releasable to allow relative movement between the sections to expose the powerplant means.

6. In an airplane, the combination of powerplant means, a wing having an average vertical thickness less than the vertical thickness of the powerplant means, the wing including an inboard section and an outboard section having confronting ends and being thickened vertically adjacent said ends, there being a cavity in the thickened portions of said sections extending in a chordwise direction and containing the powerplant means, means securing the powerplant means to one of the sections, means at a margin of the wing hingedly connecting said sections, and means at an opposite margin of the wing for connecting said sections and disconnectable to allow one section to be hinged relative to the other to expose the powerplant means.

7. In an airplane, the combination of powerplant means, a wing having an average vertical thickness less than the vertical thickness of the powerplant means, the wing including an inboard section and an outboard section having confronting ends and being thickened vertically adjacent said ends, there being a cavity in the thickened portions of said sections extending in a chordwise direction and containing the powerplant means, the powerplant means including a tubular air conducting envelope divided longitudinally into two parts, one part being secured to each wing section, an engine in the envelope carried by the part thereof which is secured to the inboard wing section, and attachment means for connecting the wing sections, certain of said attachment means being in the form of pivotal connections and the other attachment means being disconnectable so that the outboard wing section may be pivoted with respect to the inboard section to expose the engine.

8. In an airplane the combination of powerplant means, a wing having an average vertical thickness less than the vertical thickness of the powerplant means, the wing including an inboard section and an outboard section having confronting ends and being thickened vertically adjacent said ends, there being a cavity in the thickened portions of said sections extending in a chordwise direction and containing the powerplant means, the powerplant means including a tubular air conducting envelope divided longitudinally into two parts, one part being secured to each wing section, an engine in the envelope carried by the part thereof which is secured to the inboard wing section, and blower means driven by the engine for propelling air through the envelope, and attachment for connecting the wing sections, certain of the attachment means being in the form of pivotal connections and the other attachment means being disconnectable so that the outboard wing section may be pivoted with respect to the inboard section to expose the engine.

9. In an airplane the combination of a powerplant means, a wing having an average vertical thickness less than the vertical thickness of the powerplant means, the wing including an inboard section and an outboard section having confronting ends and being thickened vertically adjacent said ends, there being a cavity in the thickened portions of said sections extending in a chordwise direction and containing the powerplant neans, hinge means attaching said ends together so that the outboard section may be hinged about a generally horizontal axis to expose the powerplant means, and attachment means for securing said ends together to hold the sections in in-line relation for flight.

10. In an airplane the combination of a powerplant means, a wing having an average vertical thickness less than the vertical thickness of the powerplant means, the wing including an inboard section and an outboard section having confronting ends and being thickened vertically adjacent said ends, there being a cavity in the thickened portions of said sections extending in a chordwise direction and containing the powerplant means, hinge means connecting said ends so that the outboard section may be swung about a generally vertical axis to expose the powerplant means, and attachment means for securing said ends together to hold the wing sections in in-line relation for flight.

11. In an airplane the combination of a wing having an inboard section and an outboard section, said sections having confronting ends with a cavity therebetween, a plurality of propulsive engines arranged one above the other in generally parallel relation and contained in said cavity, means hingedly connecting said ends of the sections so that the outboard section may be swung to a position to expose the engines, and means for connecting said ends of the sections to hold the wing sections in in-line relation for flight.

12. In an airplane the combination of a wing having an inboard section and an outboard section, said sections having confronting ends with a cavity therebetween, propulsive powerplant means in said cavity, hinge means connecting said ends of the wing sections adjacent their forward sides so that the outboard section may be swung forwardly with respect to the inboard section to expose the powerplant means, and means for connecting said ends of the section to hold the sections in in-line relation for flight.

13. In an airplane, a fuselage and a swept-back wing extending laterally and rearwardly from the fuselage, the wing including an inboard section and an outboard section having confronting ends with a cavity between said ends, propulsive powerplant means in the cavity supported by one of said sections, hinge means connecting said ends of the sections adjacent the forward margin of the wing so that the outboard section may be swung forwardly and toward the fuselage to expose the powerplant means, and means for connecting said ends of the sections to hold them in the in-line relation for flight.

14. An airplane including a wing having two sections with a cavity therebetween, a mounting frame in the cavity, powerplant means carried by the frame, and means connecting the sections and disconnectable to allow relative movement between the sections to expose the frame and powerplant means.

15. In an airplane, a wing comprising two structural sections having confronting ends defining a divergent passage for the diffusion of inducted air and a communicating convergent passage for acceleration of said air, and a reaction powerplant lying between said ends including means for adding energy to said air between said passages.

16. In an airplane, a wing of predetermined airfoil section, said wing having a chordwise thickened region of generally similar airfoil section, said region possessing a chordwise separable joint at the plane of maximum thickness, a through-flow air passage leading from the front to the rear of said wing within the confines of said joint, and a powerplant in said passage arranged to induce said through-flow.

17. In an airplane the combination of; powerplant means, a wing including two sections, confronting generally C-shaped yokes on the ends of the wing sections, the yokes of the two sections together defining a cavity containing the powerplant means, means for mounting the powerplant means in said cavity, and means connecting said yokes to secure said wing sections together in in-line relation and disconnectable to allow relative movement between the sections to expose the powerplant means.

18. In an airplane the combination of; powerplant means, a wing including two sections arranged in in-line end to end relation to have confronting ends, vertically thickened chordwise extending portions on said ends of the sections together defining a cavity containing said powerplant means, said portions having forwardly convergent forward ends constituting an air inlet and having rearwardly convergent aft ends providing an outlet, and attachment means securing said thickened portions together to hold the wing sections in said in-line relation and disconnectable to allow relative movement between the sections to expose the powerplant.

NATHAN C. PRICE.

References Cited in the file of this patent

UNITED STATES PATENTS

| Number | Name | Date |
| --- | --- | --- |
| 1,237,889 | Fernandez | Aug. 21, 1917 |
| 1,319,414 | Page | Oct. 21, 1919 |
| 1,605,045 | Mader | Nov. 2, 1926 |
| 2,048,399 | Loening | July 21, 1936 |

FOREIGN PATENTS

| Number | Country | Date |
| --- | --- | --- |
| 474,003 | Great Britain | Oct. 25, 1937 |
| 556,478 | Great Britain | Oct. 6, 1943 |